(12) United States Patent
Tian et al.

(10) Patent No.: US 10,430,174 B2
(45) Date of Patent: Oct. 1, 2019

(54) TERMINAL DEVICE AND CHARGE CONTROL METHOD

(71) Applicant: GUANGDONG OPPO MOBILE TELECOMMUNICATIONS CORP., LTD., Dongguan (CN)

(72) Inventors: Chen Tian, Dongguan (CN); Jialiang Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/338,483

(22) Filed: Oct. 31, 2016

(65) Prior Publication Data

US 2017/0090908 A1    Mar. 30, 2017

Related U.S. Application Data

(63) Continuation of application No. PCT/CN2015/090621, filed on Sep. 24, 2015.

(51) Int. Cl.
 *G06F 8/65* (2018.01)
 *G06F 9/4401* (2018.01)
 (Continued)

(52) U.S. Cl.
 CPC ............... *G06F 8/65* (2013.01); *G06F 8/654* (2018.02); *G06F 9/4403* (2013.01); *G06F 9/44505* (2013.01)

(58) Field of Classification Search
 CPC ....... G06F 8/65; G06F 9/4403; G06F 9/44505
 (Continued)

(56) References Cited

U.S. PATENT DOCUMENTS 5,506,490 A * 4/1996 DeMuro ................ H02J 7/0011
                                                    320/106
2003/0076072 A1   4/2003 Tojo et al.
(Continued)

FOREIGN PATENT DOCUMENTS

CN          1551617 A    12/2004
CN        101814635 A     8/2010
(Continued)

OTHER PUBLICATIONS

Benchmarq Microelectronics Inc. et al., "System Management Bus Specification", Rev 1.0 (Year: 1995).*
(Continued)

*Primary Examiner* — S. Sough
*Assistant Examiner* — Timothy P Duncan
(74) *Attorney, Agent, or Firm* — Hodgson Russ LLP (57) ABSTRACT

In a terminal device and a method for controlling charging, a first processor controls an adapter to charge terminal device when the terminal device is connected to the adapter. The method includes receiving trigger information by the first processor; turning on a first communication interface according to the trigger information by the first processor; acquiring a firmware update file of the firmware from a server by a second processor; transmitting the firmware update file to the first processor via the first communication interface by the second processor; and updating the firmware according to the firmware update file by the first processor.

18 Claims, 5 Drawing Sheets

(51) Int. Cl.
*G06F 9/445* (2018.01)
*G06F 8/654* (2018.01)

(58) Field of Classification Search
USPC .................................................. 717/168–178
See application file for complete search history.

(56) References Cited

U.S. PATENT DOCUMENTS

| | | |
|---|---|---|
| 2003/0135705 A1 | 7/2003 | Montero |
| 2005/0001586 A1 | 1/2005 | Tashiro |
| 2008/0052699 A1 | 2/2008 | Baker |
| 2010/0049900 A1* | 2/2010 | Chiou ...................... G06F 8/65 711/103 |
| 2010/0213891 A1 | 8/2010 | Nishikawa et al. |
| 2012/0071215 A1* | 3/2012 | Bourque ................. G06F 1/266 455/573 |
| 2013/0082662 A1* | 4/2013 | Carre ................... H02J 7/0052 320/134 |
| 2014/0208092 A1 | 7/2014 | Huang |
| 2014/0229748 A1* | 8/2014 | Li .............................. G06F 1/26 713/300 |
| 2015/0236547 A1* | 8/2015 | Davis ...................... H02J 7/042 320/111 |
| 2016/0285289 A1* | 9/2016 | Arends ................. H02J 7/0054 |
| 2016/0306622 A1* | 10/2016 | Kim ................... H04B 10/1141 |

FOREIGN PATENT DOCUMENTS

| | | |
|---|---|---|
| CN | 102033593 A | 4/2011 |
| CN | 103942061 A | 7/2014 |
| EP | 1253663 A1 | 10/2002 |

OTHER PUBLICATIONS

Benchmarq Microelectronics Inc. et al., "Smart Battery Charger Specification", Rev 1.1 (Year: 1998).*

* cited by examiner

TERMINAL DEVICE AND CHARGE CONTROL METHOD

CROSS REFERENCE TO RELATED APPLICATION

This application is a continuation of International Application No. PCT/CN2015/090621 filed Sep. 24, 2015. The entire disclosure of the above application is incorporated herein by reference.

BACKGROUND

Field

The present disclosure relates to charging technology field, and more particularly to a terminal device and a charge control method.

Background

At present, a known charge control method based on a terminal device (such as fast charging technology), such as communication between the terminal device and an adapter, transmits related parameters for controlling charging, (such as temperature, power, and so on of a battery), based on related parameters, to control the charging, so as to improve speed or security of the charging.

However, in the above technology, actions and process of the terminal device are dependent on control instructions stored in firmware stored in a processor of the terminal device, where the firmware is in the terminal device or in the processor when the processor was manufactured by the manufacturer. Therefore, in the fast charging technology, the terminal device can only run the above charging process with the adapter controlled by the stored firmware, seriously affecting the utility and universality of the charging technology based on the terminal device.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF THE PREFERRED EMBODIMENTS

A clear and complete description of technical solutions provided in the embodiments of the present disclosure will be given below, in conjunction with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

Figure 1:
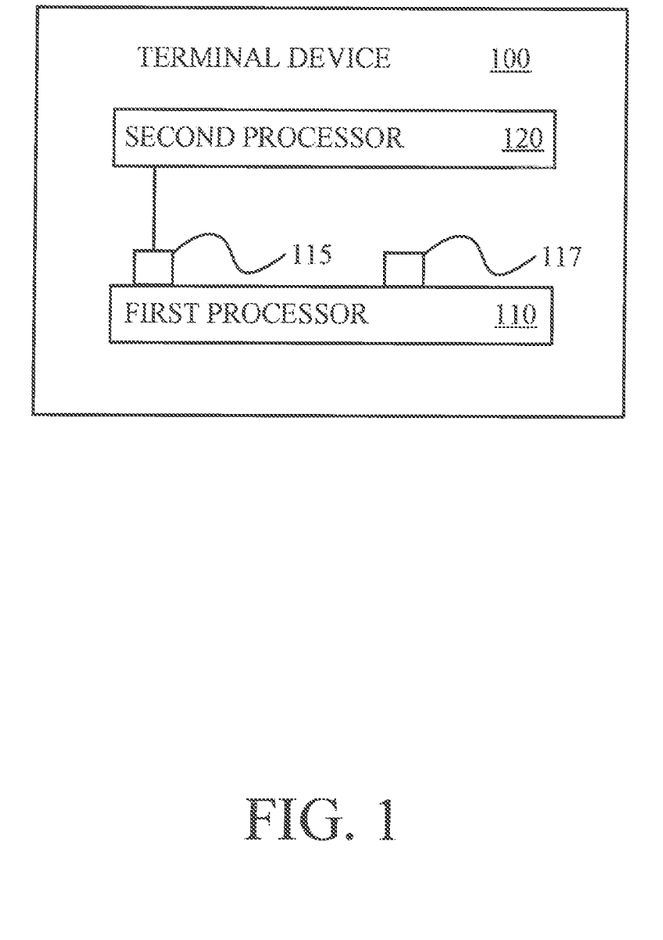
FIG. 1 is an illustrative block diagram of a terminal device in accordance with an embodiment of the present disclosure.

FIG. 1 is an illustrative block diagram of a terminal device in accordance with an embodiment of the present disclosure. As shown in FIG I, the terminal device 100 includes:

A first processor 110 having firmware stored therein and configured to read a control instruction stored in the firmware when the terminal device 100 is connected to an adapter, so as to control the adapter to charge the terminal device 100. The first processor 110 has a first communication interface 115 and a second communication interface 117. The first communication interface 115 is in a turned-off state when the first processor 110 has the firmware stored therein. The second communication interface 117 remains in a turned-on state. The first processor 110 is further configured to receive trigger information via the second communication interface 117 when the first communication interface 115 is in the turned-off state, and configured to turn on the first communication interface 115 according to the trigger information, receive a firmware update file of the stored firmware transmitted by a second processor 120 via the first communication interface 115, and update the stored firmware according to the firmware update file.

The second processor 120 is configured to acquire, from a server, the firmware update file of the firmware stored in the first processor 110 and transmit the firmware update file to the first processor 110 via the first communication interface 115.

Each part of the terminal device 100 will be described in detail as follows,

A. the first processor 110:

When the terminal device 100 is connected to the adapter, for example, via a universal serial bus (an abbreviation is "USB"), a communication connection can be established between the terminal device 100 and the adapter, so that data (e.g., a temperature, a voltage, or power of a battery of the terminal device 100) or an instruction (e.g., an instruction indicating a current or a voltage required to be outputted by the adapter) can be transmitted between the processor 110 and the adapter to control the adapter to charge the terminal device 100.

It is noted that a method and a process for controlling the adapter to charge the terminal device 100 by the first processor 110 in the embodiment of the present disclosure can be similar to those in the related art. Herein, detailed descriptions are omitted to avoid repetition.

Figure 2:
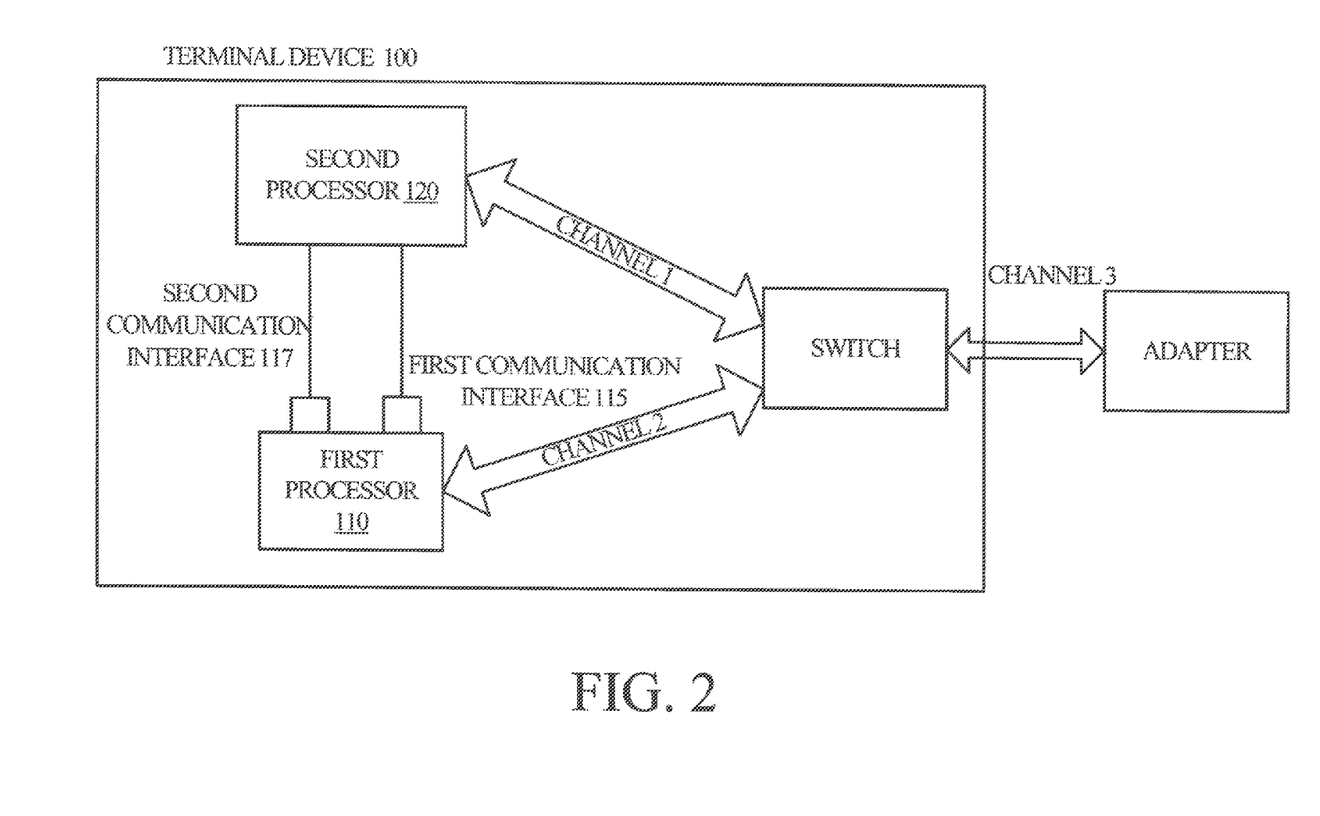
FIG. 2 is a connection schematic diagram between the terminal device and an adapter in accordance with an embodiment of the present disclosure.
Figure 3:
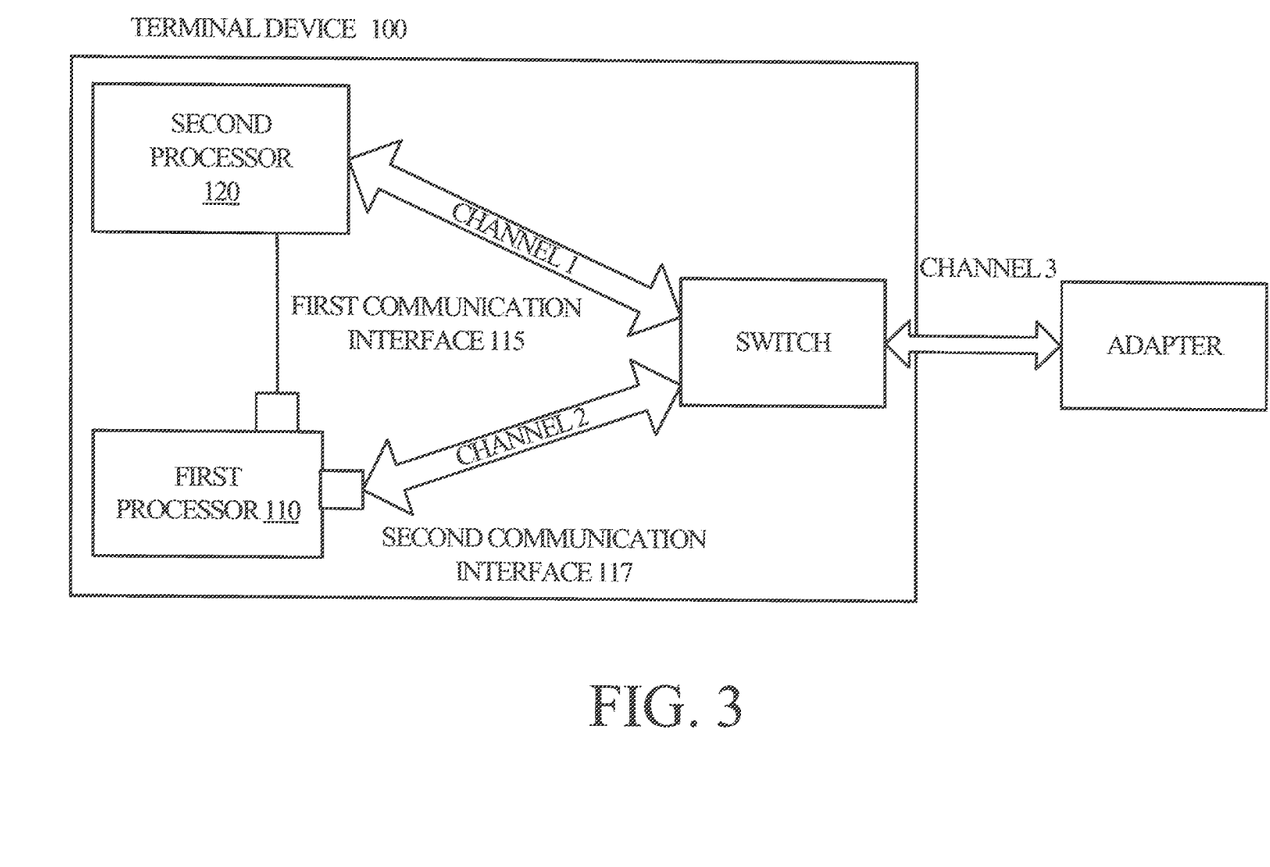
FIG. 3 is a connection schematic diagram between the terminal device and the adapter in accordance with another embodiment of the present disclosure.

Furthermore, in the embodiment of the present disclosure, for example, the communication connection between the terminal device 100 and the adapter can be constituted by a channel 2, a switch, and a channel 3 as shown in FIG. 2 or FIG. 3. The switch can be configured to control a connection state of a channel 3 to be switched to a connection to the channel 1 (i.e. a channel utilized by the second processor 120) or a connection to the channel 2 (i.e. a channel utilized by the first processor 110).

It is noted that an implementation of the communication connection between the terminal device 100 and the adapter as shown in FIG. 2 or FIG. 3 is only an illustrative example, and the present disclosure is not limited thereto. All of other implementations of the communication connection between the terminal device 100 and the adapter fall into the protection scope of the present disclosure. For example, the switch is not configured, so that the channel 3 is connected to both the channel 1 and the channel 2.

In the embodiment of the present disclosure, the first processor 110 can implement the method and the process for controlling the adapter to charge the terminal device 100 by the first processor 110 by executing a control instruction stored in the firmware. Moreover, in the embodiment of the present disclosure, a manufacturing method and a process of the firmware can be similar to those in the related art. Herein, detailed descriptions are omitted to avoid repetition. A method and a process of acquiring and updating the firmware by the first processor 110 will be described in detail as follows.

In the embodiment of the present disclosure, the first processor 110 may be a microcontroller unit (MCU). The microcontroller unit is also called "single chip microcomputer" in which a frequency and a specification of a central process unit (CPU) are properly decreased, and a memory, a timer, peripheral interfaces such as USB are integrated into a single chip to form a chip-level computer, which can perform different combinations of control fir various applications.

B. the second processor 120:

In the embodiment of the present disclosure, the second processor 120 can control the terminal device 100 to acquire the above-mentioned firmware provided by the server via, for example, a wireless communication or a wired communication.

As an example, rather than a limitation, identification (or information which can uniquely determine the server, for example, a uniform resource locator (URL) address or an internet protocol (IP) address of the server) can be stored in the terminal device 100 in advance (for example, a storage in the terminal device 100 connected to the second processor 120), so that the second processor 120 can transmit request information for requesting the server issuing the firmware to the terminal device 100 (specifically, the second processor 120) according to the identification of the server. Moreover, the request information can further include related information of the terminal device 100 (for example, a mobile phone number of the terminal device 100), so that the server can perform authentication according to the related information of the terminal device 100 and issues the firmware to the terminal device 100 after the authentication.

As an example, rather than a limitation, the request information can carry related information of the terminal device 100 (for example, a brand, a model, or a manufacturer of the terminal device 100), so that the server can determine, according to the related information of the terminal device 100, firmware corresponding to adapters which are likely to be connected to the terminal device 100, thereby further improving practicability and reliability of the present disclosure.

Optionally, the adapter is configured to charge the terminal device 100 fast.

Specifically, in the embodiment of the present disclosure, when the terminal device 100 is connected to the adapter, the second processor 120 can be communicatively connected to the adapter via, for example, the channel 1 and the channel 3 as shown in FIG. 2, to determine a type of the adapter (e.g., whether an adapter which can charge the terminal device 100 fast). Moreover, a method and a process for determining the type of the adapter can be similar to those in the related art. Herein, detailed descriptions are omitted to avoid repetition.

Optionally, the second processor 120 is further configured to prohibit communication between the first processor 110 and the adapter before determining that the adapter is configured to charge the terminal device 100 fast.

Specifically, in the embodiment of the present disclosure, when the terminal device is connected to an external device via, for example, a USB interface, the second processor 120 can determine a type of the external device. An example of the external device can be a common adapter (i.e. charging of the terminal device 100 is not controlled by the first processor 110), a fast charger, or another terminal device (e.g., a computer device).

Moreover, when the second processor 120 identifies that the type of the connected external device is an adapter configured to charge the terminal device 100 fast, it can allow the first processor 110 to communicate with the external device. For example, the first processor 110 can control the switch in FIG. 2, so that the channel 2 is connected to the channel 3.

Alternatively, when the second processor 120 identifies that the type of the connected external device is not an adapter configured to charge the terminal device 100 fast, it prohibits the first processor 110 to communicate with the external device. For example, the first processor 110 can control the switch in FIG. 2, so that the channel 2 is not connected to the channel 3.

Optionally, the second processor 120 is further configured to determine related information of the adapter connected to the terminal device 100 and acquire the firmware configured to control the adapter according to the related information of the adapter.

Specifically, in the embodiment of the present disclosure, the second processor 120 can further acquire related information of the adapter (for example, a brand, a model, or a manufacturer of the adapter). Herein, the related information of the adapter may be transmitted to the second processor 120 by the adapter. Alternatively, the related information of the adapter may be inputted to the second processor 120 via an input component of the terminal device by a user, and the present disclosure is not limited thereto.

Moreover, the second processor 120 further can further transmit the related information of the adapter to the server, so that the server can determine firmware which can implement to control the adapter, thereby further improving the practicability and the reliability of the present disclosure.

Furthermore, the above-mentioned process of acquiring the firmware by the second processor 120 can be automatically completed after being started up, can be completed according to an input command from the user, can be performed periodically, or can be completed by a trigger of the server. The present disclosure is not limited thereto.

A process of acquiring the firmware from the second processor 120 by the first processor 110 is described in detail as follows.

In the embodiment of the present disclosure, the first processor 110 is provided therein the first communication interface 115. The first communication interface 115 can be configured to transmit the firmware between the first processor 110 and the second processor 120. Moreover, for example, when the terminal device 100 leaves a factory, has a failed update of the firmware, or is formatted to be restored in a factory configuration, the firmware is not stored in the first processor 110.

In the embodiment of the present disclosure, when the firmware is not stored in the first processor 110, the first communication interface 115 is in the turned-on state.

Accordingly, the second processor 120 can transmit the acquired firmware to the first processor 110.

Moreover, in the embodiment of the present disclosure, other data or information can be transmitted via the first communication interface 115 besides the firmware or the firmware update file (the firmware update file will be described in detail in the following). The present disclosure is not limited thereto.

It is noted that in the embodiment of the present disclosure, the first communication interface 115 may be an Inter-Integrated Circuit (I2C) interface. I2C, which is an interface of a two-line serial bus configured to connecting a processor with a peripheral device, is a bus standard which is widely utilized in a microelectronic communication control field. It is a special format of synchronous communication and has advantages of fewer interface lines, a simple control method, a small device package form, and a higher communication speed.

In the terminal device in accordance with the embodiment of the present disclosure, the first communication interface is disposed in the first processor of the terminal device, and the first communication interface is in the turned-on state when the firmware is not stored in the first processor. When the firmware is not stored in the first processor, the second processor can transmit the firmware acquired from the server to the first processor via the first communication interface. Accordingly, the first processor can read the control instruction stored in the firmware to control the adapter to charge the terminal device and can acquire the firmware corresponding to the connected adapter from the server according to the connected adapter, thereby improving practicality and generality of a charge method based on control of the terminal device.

It is noted that in the embodiment of the present disclosure, the first processor 110 may store the firmware after acquiring the firmware. In the embodiment of the present disclosure, the storing represents that the first processor 110 may store the firmware in a storage medium disposed in the first processor 110, or the first processor 110 may store the firmware in a storage connected to the first processor 110 in the terminal device 100. The present disclosure is not limited thereto.

Furthermore, the above-mentioned example of the method for acquiring the firmware is only illustratively described. The present disclosure is not limited thereto. For example, the firmware may be stored in the first processor 110 by a manufacturer in a manufacturing process of the first processor 110.

When the firmware is stored in the first processor 110, the first communication interface 115 is in the turned-off state.

Specifically, in the embodiment of the present disclosure, when the firmware is stored in the first processor 110, the first communication interface 115 is in the turned-off state. Accordingly, repetition transmission of the firmware can be avoided. Energy consumption can be saved. Burdens of the first processor 110 and the second processor 120 can be reduced.

With upgrading of hardware products and development of technology, a situation that an original firmware cannot meet a need of the user (for example, a vulnerability exists in the firmware) occurs. Therefore, the firmware required to be updated.

In the related art, the firmware is stored in the processor in a manufacturing process of the terminal device. Accordingly, when the firmware required to be updated, the terminal device can only be returned to the factory. Normal use of the user is seriously affected, and product cost is increased.

In view of the above-mentioned problem, the present disclosure further provides a method for updating the firmware stored in the first processor 110.

In the embodiment of the present disclosure, the second processor 120 can control the terminal device (e.g., a transceiver of the terminal device) to acquire the firmware update file from the server via a wireless communication or a wired communication.

In the embodiment of the present disclosure, the firmware update file is configured to update the firmware. Moreover, a method for generating the firmware update file and a process for updating the firmware can be similar to those in the related art. Herein, detailed descriptions are omitted to avoid repetition.

As an example, rather than a limitation, identification (or information which can uniquely determine the server, for example, a uniform resource locator (URL) address or an internet protocol (IP) address of the server) can be stored in the terminal device 100 in advance (for example, a storage in the terminal device 100 connected to the second processor 120), so that the second processor 120 can transmit request information for requesting the server issuing the firmware update file to the terminal device 100 (specifically, the second processor 120) according to the identification of the server. Moreover, the request information can further include related information of the terminal device 100 (for example, a mobile phone number of the terminal device 100), so that the server can perform authentication according to the related information of the terminal device 100 and issues the firmware update file to the terminal device 100 after the authentication.

As an example, rather than a limitation, the request information can carry related information of the terminal device 100 (for example, a brand, a model, or a manufacturer of the terminal device 100), so that the server can determine, according to the related information of the terminal device 100, firmware update file corresponding to adapters which are likely to be connected to the terminal device 100, thereby further improving practicability and reliability of the present disclosure.

Furthermore, in the embodiment of the present disclosure, the firmware update file may be acquired from the server by the second processor 120 according to the user's operation, may be acquired from the server after the second processor 120 initiates a request periodically, or may be initiatively issued to the second processor by the server. For example, the server may transmit the firmware update file to the terminal device 10 together with an update file of an operating system of the terminal device 100.

A process of acquiring the firmware update file from the second processor 120 by the first processor 110 is described in detail as follows.

In the embodiment of the present disclosure, the first processor 110 is provided therein the first communication interface. The first communication interface 115 can be configured to transmit the firmware or the firmware update file between the first processor 110 and the second processor 120. Moreover, when the firmware is not stored in the first processor 110, the first communication interface 115 is in the turned-off state.

In the embodiment of the present disclosure, the first processor 110 is further provided therein the second communication interface 117 which remains in the turned-on state. The second communication interface 117 is configured to transmit the trigger information for triggering the first communication interface 115 to be turned on.

In the embodiment of the present disclosure, the trigger information may be a level signal in a prescribed pattern. For example, one or more low level signals, one or more high level signals, or combinations of the high and low level signals. Alternatively, the trigger information may be a digital signal or an analog signal. The present disclosure is not limited thereto.

As an example, rather than a limitation, in the embodiment of the present disclosure, the second communication interface 117 may be a general purpose input/output (GPIO) interface.

In the embodiment of the present disclosure, the trigger information may be transmitted by the second processor 120 (i.e. Situation 1) or may be transmitted by the adapter (i.e. Situation 2). Processes of the above-mentioned situations are respectively described in detail as follows.

Situation 1:

Optionally, the trigger information is specifically transmitted by the second processor 120.

Specifically, as shown in FIG. 2, in the embodiment of the present disclosure, the second processor 120 may be connected to the first processor 110 via. the second communication interface 117. As such, the second processor 120 may transmit the above-mentioned trigger information to the first processor 110 via the second communication interface 117.

Optionally, the specific trigger information is transmitted after the second processor 120 acquires the firmware update file.

Specifically, in the embodiment of the present disclosure, the second processor 120 may transmit the trigger information to the first processor 110 after acquiring the firmware update file as mentioned above, thereby updating the firmware stored in the first processor 110 in time.

It should be appreciated that the above-mentioned example of timing of transmitting the trigger information from the second processor 120 to the first processor 110 is only illustratively described. The present disclosure is not limited thereto. For example, the second processor 120 may transmit the trigger information to the first processor 110 periodically or after the terminal device 100 is re-started.

Situation 2:

Optionally; the trigger information is specifically transmitted by the adapter.

Specifically, as shown in FIG. 3, in the embodiment of the present disclosure, after the terminal device 100 is connected to the adapter which is configured to charge fast, the adapter may be connected to the first processor 110 via the second communication interface 117. As such, the adapter may transmit the above-mentioned trigger information to the first processor 110.

Optionally, the first processor 110 is further configured to transmit version indicating information. The version indicating information is configured to indicate a version of the firmware stored in the first processor 110.

The second processor 120 is further configured to determine to transmit the firmware update file to the first processor 110.

Specifically, in the embodiment of the present disclosure, after receiving the trigger information, the first processor 110 turns on the first communication interface 115 and transmits the version information stored in the first processor 110 (or stored in the storage connected to the first processor 110) to the second processor 120 via the first communication interface 115.

After receiving the version information, the second processor 120 may determine whether the acquired firmware update file can be applied to update the firmware stored in the first processor 110. For example, when the firmware which is updated by the firmware update file is an update version of the first processor 110 which is stored in the first processor 110 (e.g., a version number of the firmware which is updated by the firmware update file is newer than a version number of the first processor 110 which is stored in the first processor 110), the second processor 120 can determine that the acquired firmware update file can be applied to update the firmware stored in the first processor 110. As such, the firmware update file may be transmitted to the first processor via the first communication interface 115.

Optionally, the first processor 110 is specifically configured to transmit the version indicating information to the second processor 120 after determining that the terminal device 100 is re-started for a last time and connected to the adapter for a first time.

Specifically; in a general situation, the terminal device 100 is re-started after the operating system is updated. Moreover, the firmware which is utilized by the first processor 110 is usually updated with the operating system. Accordingly, after the terminal device 100 is re-started, possibility that the firmware requires to be updated is higher. Moreover, the first processor 110 is configured to control the connected adapter. Accordingly, in the embodiment of the present disclosure, the first processor 110 may determine whether it is required to transmit the firmware version information which is stored currently to the second processor 120 according to a re-starting situation of the terminal device 100 and a connection situation of the adapter.

For example, when a current state of the terminal device 100 is that the terminal device 100 is re-started for the last time and connected to the adapter, which is configured to charge fast, for the first time, the firmware version information of the firmware which is stored currently is transmitted to the second processor 120.

Alternatively, when the current state of the terminal device 100 is that the terminal device 100 is re-started for the last time and not connected to the adapter, which is configured to charge fast, for the first time, the firmware version information of the firmware which is stored currently is prohibited to be transmitted to the second processor 120.

As such, an unnecessary interaction between the first processor 110 and the second processor 120 can be decreased, and the energy consumption and processing burden are reduced.

Moreover, a method for determining whether the terminal device 100 is re-started for the last time and connected to the adapter for the first time, a counter can be disposed. The counter increases after the connection to the adapter every time. Moreover, the counter is reset to zero after the terminal device 100 is re-started and recounts.

In the embodiment of the present disclosure, a function of the counter may be integrated in the second processor 120 or the first processor 110. The present disclosure is not limited thereto.

After acquiring the firmware update file from the second processor 120, the first processor 110 can update the stored firmware. Moreover, an update process can be similar to those in the related art. Herein, detailed descriptions are omitted to avoid repetition.

Figure 4:
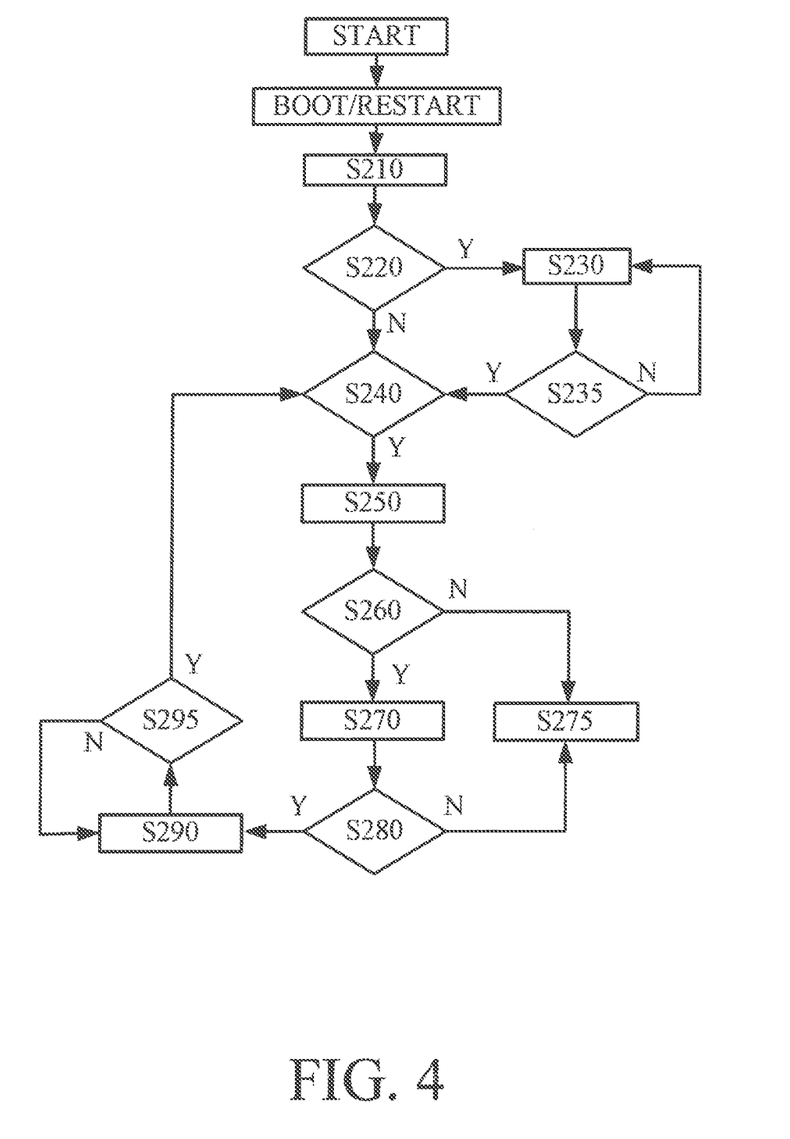
FIG. 4 is a schematic flowchart of a charge control method in accordance with an embodiment of the present disclosure.

FIG. 4 is a specific flowchart that the terminal device 100 acquires the firmware and updates the firmware in accordance with an embodiment of the present disclosure. As shown in FIG. 4:

At block S210, the second processor 120 may acquire the firmware and/or the firmware update file.

At block S220, the second processor 120 may determine whether the first communication interface 115 of the first processor 110 is turned on. For example, the second processor 120 may transmit a detecting signal to the first processor 110 via the communication interface 115.

At block S220, when the second processor 120 may acquire a response from the first processor 110, it can be determined that the first communication interface 115 is in the turned-on state. That is, the firmware is not stored in the first processor 110. At block S230, the second processor 120 may transmit the firmware to the first processor 110 via the first communication interface 115. Moreover, after the firmware is transmitted completely, the first processor 110 may transmit verification information to the second processor 120 to indicate whether the transmitted firmware can be utilized normally. As such, at block S235, the second processor 120 tests the verification information. When it is determined that the firmware can be utilized normally, the method goes to block S240. When it is determined that the firmware cannot be utilized normally (e.g., a failed transmission), the firmware is retransmitted.

At block S220, when the second processor 120 cannot acquire the response from the first processor 110, it can be determined that the first communication interface 115 is in the turned-off state. That is, the firmware is stored in the first processor 110. As such, at block S240, the second processor 120 determines whether the adapter configured to charge fast is inserted.

At block S240, when it is determined that the adapter is inserted, the second processor 120 controls the first processor 110 to be communicatively connected to the adapter at block S250. Moreover, the second processor 120 or the adapter may transmit the trigger information to the first processor 110 to turn on the first communication interface 115.

At block S240, when it is determined that the adapter is not inserted, the second processor 120 continues to wait.

At block S260, the first processor 110 may determine whether the state of the first processor 100 is that the terminal device 100 is re-started for the last time and connected to the adapter for the first time.

At block S260, if the determination is yes, the first processor 110 may report the stored firmware version information of the firmware to the second processor 120 at block S270.

At block S260, if the determination is no, a fast charging is performed at block S275.

At block S280, the second processor 120 determines whether it is necessary to update the stored firmware according to the reported firmware version information.

At block S280, if the determination is no, the fast charging is performed at block S275.

At block S280, if the determination is yes, the second processor 120 transmits the firmware update file to the first processor 110 via the first communication interface 115 at block S290. Moreover, after the firmware update file is transmitted completely, the first processor 110 may transmit verification information to the second processor 120 to indicate whether the transmitted firmware can be utilized normally. At block S295, the second processor 120 tests the verification information. When it is determined that the firmware can be utilized normally, the method goes to block S240. When it is determined that the firmware cannot be utilized normally (e.g., a failed transmission), the firmware is retransmitted.

In the terminal device in accordance with the embodiment of the present disclosure, the first communication interface is disposed in the first processor of the terminal device, and the first communication interface is in the turned-off state when the firmware is stored in the first processor As such, when the firmware is stored in the first processor, the second processor or the adapter can transmit the trigger information to the first processor to turn on the first communication interface. The second processor can transmit the firmware update file which is acquired form the server to the first processor, thereby achieving the update of the firmware and improving the practicality and the generality of the charge method based on control of the terminal device.

Moreover, the process of acquiring the firmware or the firmware update file and the process of controlling the adapter based on the firmware are accomplished by different processors, so that reliability of the charging can be increased.

In the embodiment of the present disclosure, the terminal device may be any one of various devices having a battery disposed therein and capable of charging the battery by utilizing an externally acquired current, for example, a mobile terminal, a tablet, a computing device, or an information display device.

Taking a mobile phone as an example, the terminal device of the present disclosure is introduced. In the embodiment of the present disclosure, the mobile phone includes a radio frequency circuit, a storage, an input unit, a wireless fidelity (WIFI) module, a display unit, a sensor, an audio circuit, a processor, a projection unit, a camera unit, a battery, and so on.

The radio frequency circuit is configured to receive and send signals during a message or call handing. In particular, the radio frequency circuit receives downlink messages from a base station and passes them to the processor for further processing. In addition, the radio frequency circuit sends uplink data to the base station. The radio frequency circuit may include but is not limited to an antenna, at least one amplifier, a transceiver, a coupler, a low noise amplifier, a duplexer, and so on. Furthermore, the radio frequency circuit may communicate with other devices via wireless communication and a network. The wireless communication may use any one of a plurality of communications standards or protocols, including but not limited to Global System for Mobile communications (GSM), General Packet Radio Service (GPRS), code division multiple access (CDMA), wide-band code division multiple access (WCDMA), Long Term Evolution (LTE), a protocol for email, Short Message Services (SMS), and so on.

The storage is configured to store software programs and modules. The processor run the software programs and the modules stored in the storage to perform various functions of the mobile phone and to process data. The storage may include a program section and a data storage section. The storage section can be configured to store an operating system, at least one application (such as sound playback, image playback, etc.) for a certain required function. The data storage section can be configured to store data created by the mobile phone during operation (such as audio data, phone book, etc.). In addition, the storage may include high speed random access memory and may also include non-volatile memory, such as at least one magnetic disk storage device, flash memory device, or other non-volatile solid state memory device.

The input unit can be configured to receive input numbers or character information, and generate key signal input in relation to user settings and functional control of the mobile phone. Specifically, the input unit includes a touch panel and other input devices. The touch panel, which is also called a touch screen, can gather a touch operation (for example, users use a finger, a stylus, and any other suitable object or attachment on or near the touch panel) and drive a connecting device according to preset programs. Optionally; the touch screen may include a touch-sensitive device and a touch screen controller. The touch-sensitive device detects a direction of the user's touch, detects signals resulted from the touch operation, and transmits the signals to the touch controller. The touch screen controller receives information of the touch, converts it into a touch coordinate, further transmits the coordinate to the processor, and further receives and executes an instruction from the processor. Furthermore, the touch panel may be implemented by utilizing capacitive, resistive, infrared, and surface acoustic wave technologies. In addition, the input unit may further include other input devices. Specifically; the other input devices include but not limited to one or any of the combination of a physical keyboard, function keys (such as volume control keys, switches keys, etc.), a trackball, a mouse, an operating lever.

The display unit is configured to display input information from the user, information provided to the user, or different kinds of menus of the mobile phone. The display unit may include a display panel, optionally, which may utilize liquid crystal display (LCD) technology or Organic Light-Emitting Diode (OLED) technology. Furthermore, the touch panel may cover the display panel. When the touch panel detects a touch operation on or near its surface and transmits a corresponding signal to the processor to determine a type of the touch, the processor controls the display panel to provide appropriate visual output according to the type of the touch.

A position on the display panel for visual output to be recognized by the human eyes, can be considered as a "display area." The touch panel and the display panel may be separated from each other to implement input and output functions of the mobile phone. Alternatively, the touch panel and the display panel may be integrated together to implement input and output functions of the mobile phone.

The mobile phone may further include at least one sensor, such as a voltage sensor, a temperature sensor, a posture sensor, a light sensor, and other sensors.

Specifically, the posture sensor is also called a motion sensor. And as one of the motion sensor, a gravity sensor (G-sensor) can be listed. The G-sensor has a cantilever shifter made by elastic sensitive element, and an energy storage spring made by elastic sensitive element to drive the electric contact, so as to realize the Charge from the gravity charge into an electrical signal.

As another one of the motion sensor, an acceleration sensor can be listed. The acceleration sensor can detect acceleration speed on all directions (generally up to three axis), can detect magnitude and direction of the gravity when still, and can identify a gesture of the mobile phone application (such as a screen switch between landscape style and portrait style, relevant games, and magnetometer calibration) and identify the vibration function (such as pedometer, and knock), and so on.

In the embodiment of the present disclosure, the listed motion sensor can be a component to acquire "posture parameters", but it is not a limitation, other sensors which can acquire the "posture parameters" also fall into the protection scope of the present invention. For example, a gyroscope and others, where the working principle and data processing procedure of the gyroscope is similar to the existing technology. Herein, detailed descriptions are omitted to avoid repetition.

Additionally, in the embodiment of the present disclosure, as a sensor, a barometer, a hygrometer, a thermometer, an infrared sensors and other sensor can be configured, and the details are not repeated here.

The light sensor can comprise an ambient light sensor and a proximity sensor. The ambient light sensor can adjust the brightness of the display panel according to bright or dark of the ambient light. The proximity sensor can be positioned close the display panel or the back light when the mobile phone is closed to an ear.

The audio circuit, a speaker, and a microphone provide an audio interface between the user and the mobile phone. The audio circuit converts received audio data to an electrical signal and transmits the electrical signal to the speaker. The speaker converts the electrical signal to sound signals and outputs the sound signals. In addition, the microphone converts collected sound signal to electrical signals. The audio circuit converts the electrical signal to audio data and transmits the audio data to the processor for processing. After the processing, the audio data may be transmitted to another mobile phone via the radio frequency circuit, or transmitted to the storage for further processing.

WIFI belongs to short distance wireless transmission technology. The mobile phone can be used for sending and receiving email, browsing a webpage, and access streaming media, etc. by the WIFI module. It provides a user with wireless broadband Internet access. In addition, this module can be omitted according to the requirement within the scope of the present disclosure.

In the embodiment of the present disclosure, the second processor can be the control center of the mobile phone, use all kinds of interfaces and bus lines to connect all parts of the entire mobile phone, by running and executing software programs and modules stored in the memory, and call data stored in the storage to execute all kinds of functions and process the data, so as to monitor the entire mobile phone. Optionally, the second processor can comprise one or more processing units. Optionally, the processor can integrate an application processor and a modem processor. The application processor mainly deals with the operating system, the user interface, and the applications. The modem processor mainly deals with the wireless communication.

It should be understood that the modem processor can also be not integrated into the second processor.

The mobile phone further comprises a power supply (such as a battery), to supply power to each component. Preferably, the power supply can be logically connected to the processor through the power management system, and through the power management system to implement the function of charging, discharging, and power consumption. Although not shown, the mobile phone can further comprise a BLUETOOTH module. The details are not repeated here.

What should be mentioned is that, the mobile phone is only an example of the terminal device, which is not particular limited; the present disclosure can be applied in a mobile phone, a tablet computer, and other electronic device, which is not limited in the present disclosure.

Figure 5:
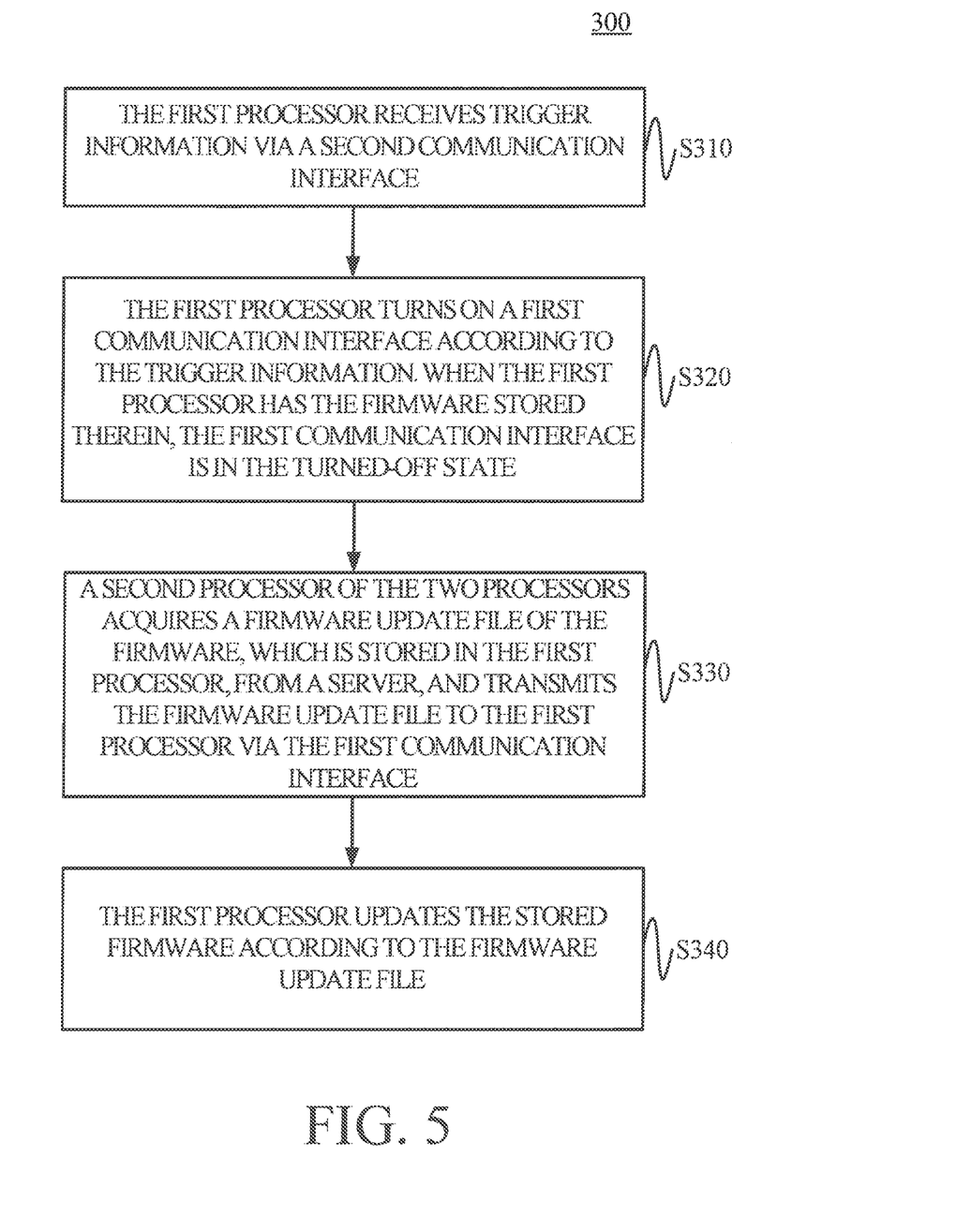
FIG. 5 is a schematic flowchart of a charge control method in accordance with another embodiment of the present disclosure.

FIG. 5 is a schematic flowchart of a charge control method 300 in accordance with another embodiment of the present disclosure. The method 300 is applied to a terminal device which comprises at least two processors. A first processor of the two processors has firmware stored therein. When the terminal device is connected to an adapter, the first processor can read a control instruction which is stored in the firmware to control the adapter to charge the terminal device. As shown in FIG. 5, the method 300 includes the following steps.

At block S310, the first processor receives trigger information via a second communication interface.

At block S320, the first processor turns on a first communication interface according to the trigger information. When the first processor has the firmware stored therein, the first communication interface is in the turned-off state.

At block S330, a second processor of the two processors acquires a firmware update file of the firmware, which is stored in the first processor, from a server, and transmits the firmware update file to the first processor via the first communication interface.

At block S340, the first processor updates the stored firmware according to the firmware update file.

Optionally, the trigger information is specifically transmitted by the second processor.

Optionally, the trigger information is specifically transmitted after the second processor acquires the firmware update file.

Optionally, the trigger information is specifically transmitted by the adapter.

Optionally, the method further includes the following steps.

The first processor transmits the version indicating information to the second processor via the first communication interface. The version indicating information is configured to indicate a version of the firmware stored in the first processor.

The second processor transmits the firmware update file to the first processor according to the firmware update file.

Optionally, before the first processor transmits the version indicating information via the first communication interface, the method further includes the following step.

The first processor determines a current state of the terminal device is that the terminal device is re-started for a last time and connected to the adapter for a first time.

Optionally, the adapter is configured to perform a fast charging to the terminal device.

Optionally, the method further includes the following steps.

The second processor prohibits the communication between the first processor and the adapter before the second processor determines that the adapter is configured to perform the fast charging to the terminal device.

In the above-mentioned method 300, actions and a process of the first processor are similar to those of the first processor 110 in the terminal device. Herein, detailed descriptions are omitted to avoid repetition.

Moreover, in the above-mentioned method 300, actions and a process of the second processor are similar to those of the second processor 120 in the terminal device. Herein, detailed descriptions are omitted to avoid repetition.

In the terminal device and the charge control method in accordance with the embodiment of the present disclosure, the first communication interface is disposed in the first processor of the terminal device, and the first communication interface is in the turned-on state when the firmware is not stored in the first processor. As such, when the firmware is not stored in the first processor, the second processor can transmit the firmware acquired from the server to the first processor via the first communication interface. Accordingly, the first processor can read the control instruction stored in the firmware to control the adapter to charge the terminal device and can acquire the firmware corresponding to the connected adapter from the server according to the connected adapter, thereby improving the practicality and the generality of the charge method based on control of the terminal device.

It should be understood that, in the various embodiments of the present disclosure, sequence numbers of the above-mentioned processes do not mean an execution order. The execution order of the processes should be determined by functions and inherent logic of the processes, and should not constitute any limitation on the implementation process of the embodiments of the present disclosure.

Those skilled in the art may realize that the units and algorithmic steps of the examples described in conjunction with the embodiments disclosed in the present disclosure may be realized by electronic hardware or the combination of computer software and electronic hardware. Whether these functions are executed in a hardware or software method depends on the specific applications and design constraint conditions of the technical solution. For each specific application, the described functions may be realized by professionals using different methods, but this realization shall not be considered as going beyond the scope of the present disclosure.

It should be appreciated by those Skilled in the art that for the purpose of convenience and clarity, the specific operational processes of the above-mentioned systems, devices, and units can refer to the corresponding processes in the above-mentioned embodiments of the methods and are not repeated herein.

it should be appreciated that the disclosed systems, devices, and methods in the embodiments provided by the present application can be implemented by other methods. For example, the above-mentioned described embodiments of the devices are merely illustrative. For example, the division of the units is only a logic function division, and other division methods may be adopted in practice. For example, a plurality of units or components may be combined or integrated in another system, or some features may be omitted or are not executed. In addition, the displayed or discussed mutual coupling or direct coupling or communication connection may be indirect coupling or communication connection through some interfaces, and the indirect coupling or communication connection may be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments may be fulfilled by selecting part of or all of the units according to actual needs.

In addition, in various embodiments of the present disclosure, the functional units may be integrated in one processing unit, or the function units may separately and physically exist, or two or more units may be integrated in one unit.

When the integrated unit is realized in the form of software functional units and sold or used as independent products, the integrated unit may be stored in a computer-readable storage medium. Based on such an understanding, the technical solution of the present disclosure substantially, or the part of the present disclosure making contribution to the prior art, or all or a part of the technical solution may be embodied in the form of a software product, and the computer software product is stored in a storage medium, which includes a plurality of instructions enabling computer equipment (which may be a personal computer, a server, or network equipment and the like) to execute all of or part of the steps in the methods of the embodiments of the present disclosure. The aforementioned storage medium includes various media capable of storing program codes, such as a U disk, a mobile hard disk, a read-only memory (ROM, Read-Only Memory), a random access memory (RAM, Random Access Memory), a disk or an optical disk.

The above description is merely the specific embodiments of the present disclosure, but the protection scope of the present disclosure is not limited thereto, any skilled who is familiar with this art could readily conceive variations or substitutions within the disclosed technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. A terminal device, comprising:
a first processor configured to store a firmware therein; and
a second processor configured to transmit an update file for the firmware to the first processor,
wherein the first processor has a first communication interface and a second communication interface, and the first communication interface is in a turned-off state when the first processor stores the firmware,
wherein the first processor is configured to receive trigger information via the second communication interface when the first communication interface is in the turned-off state, to turn on the first communication interface according to the trigger information, to receive the update file for the firmware from the second processor via the first communication interface, and to update the firmware according to the update file for the firmware, and
wherein the second processor is further configured to determine whether an external device is configured to charge the terminal device in a fast charging mode, and prohibit communication between the first processor and the external device in response to determining that the external device is not configured to charge the terminal device in the fast charging mode.

2. The terminal device of claim 1, wherein the second processor is configured to transmit the firmware to the first processor before the firmware is stored in the first processor.

3. The terminal device of claim 1, wherein the second processor is configured to transmit the update file for the firmware to the first processor after the firmware is stored in the first processor.

4. The terminal device of claim 1, wherein the first processor is further configured to transmit version indicating information to the second processor via the first communication interface, and the version indicating information is configured to indicate a version of the firmware stored in the first processor;
the second processor is further configured to transmit the update file for the firmware to the first processor according to the version indicating information.

5. The terminal device of claim 4, wherein the first processor is configured to transmit the version indicating information to the second processor after determining that the terminal device is re-started for a last time and the terminal device is connected to an adapter for a first time after the terminal device is re-started.

6. The terminal device of claim 5, wherein the trigger information is transmitted by the adapter.

7. The terminal device of claim 1, wherein the first processor is further configured to transmit verification information to the second processor to indicate whether the firmware is utilized normally after the first processor updates the firmware completely.

8. The terminal device of claim 1, wherein the trigger information is transmitted by the second processor after the second processor acquires the update file for the firmware.

9. The terminal device of claim 1, wherein in response to determining by the second processor that the external device is configured to charge the terminal device in the fast charging mode, the first processor is further configured to read a control instruction stored in the firmware to control the external device to charge the terminal device via the fast charging mode.

10. The terminal device of claim 1, wherein the second processor is configured to prohibit the communication between the first processor and the external device before determining whether the external device is configured to charge the terminal device in the fast charging mode.

11. A charge control method, applied to a terminal device which comprises a first processor and a second processor, the first processor storing a firmware therein, the method comprising:
receiving trigger information by the first processor when a first communication interface of the first processor is in a turned-off state, wherein the trigger information is received via a second communication interface of the first processor;
turning on the first communication interface of the first processor according to the trigger information by the first processor, wherein when the first processor stores the firmware therein, the first communication interface is in the turned-off state;
acquiring an update file for the firmware from a server by the second processor;
transmitting the update file for the firmware to the first processor by the second processor; and
updating the firmware according to the update file for the firmware by the first processor;
determining, by the second processor, whether an external device is configured to charge the terminal device in a fast charging mode, and prohibiting, by the second processor, communication between the first processor and the external device in response to determining that the external device is not configured to charge the terminal device in the fast charging mode.

12. The method of claim 11, further comprising:
transmitting, by the first processor, version indicating information to the second processor via the first communication interface of the first processor, wherein the version indicating information is configured to indicate a version of the firmware stored in the first processor; and
transmitting the update file for the firmware to the first processor according to the version indicating information by the second processor.

13. The method of claim 12, before the step of transmitting the version indicating information to the second processor via the first communication interface by the first processor, the method further comprising:
determining, by the first processor, a current connecting state of the terminal device is that the terminal device is re-started for a last time and the terminal device is connected to the adapter for a first time after the terminal device is re-started.

14. The method of claim 11, further comprising:
transmitting, by the first processor, verification information to the second processor to indicate whether the firmware is utilized normally after the first processor updates the firmware completely.

15. The method of claim 11, wherein the trigger information is transmitted by the second processor after the second processor acquires the firmware update file.

16. The method of claim 11, wherein the trigger information is transmitted by the adapter.

17. The method of claim 11, further comprising:
reading, by the first processor, a control instruction in the firmware to control the external device to charge the terminal device via the fast charging mode, in response to determining by the second processor that the external device is configured to charge the terminal device in the fast charging mode.

18. The method of claim 11, further comprising:
prohibiting, by the second processor, communication between the first processor and the external device before determining, by the second processor, whether the external device is configured to charge the terminal device in the fast charging mode.

* * * * *